Patented Mar. 26, 1935

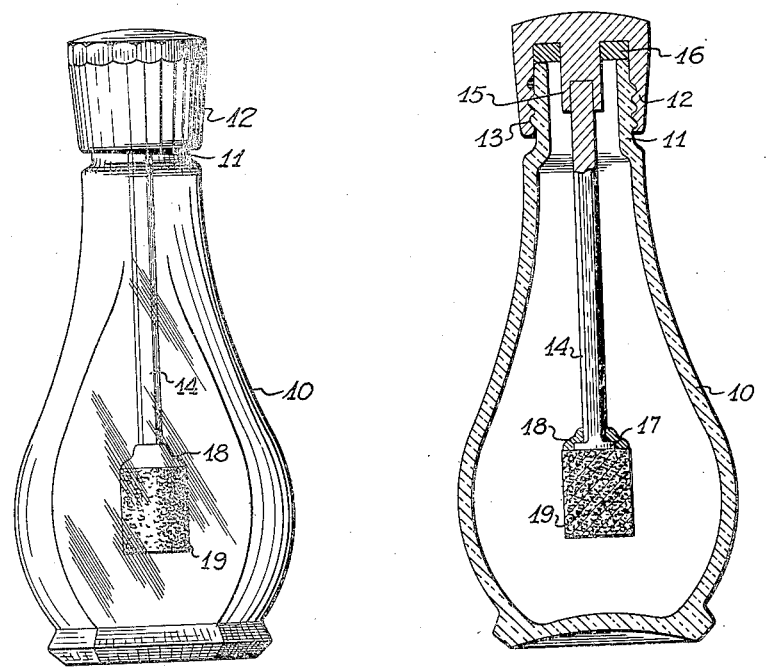

1,995,733

UNITED STATES PATENT OFFICE 1,995,733

APPLICATOR

Marshall T. Brekke, Scarsdale, N. Y., assignor to Northam Warren Corporation, New York, N. Y., a corporation of New York Application April 23, 1932, Serial No. 607,029

2 Claims. (Cl. 128—269)

My invention relates to a new and improved applicator for applying an aluminum chloride solution, of the type which is ordinarily used in deodorants. Such deodorants ordinarily consist of, or include, aluminum chloride solution, the concentration of such aluminum chloride solution being from 5% to 40%.

One of the objects of my invention is to provide an applicator in sponge form which will be resistant to the action of the aluminum chloride solution, will retain its porosity and resilience and elasticity for a long period of time and which will not impart any objectionable color and odor to the aluminum chloride solution.

Another object of my invention is to provide a sponge rubber applicator of special composition for applying an aluminum chloride solution.

Another object of my invention is to utilize a sponge rubber applicator containing substantially no free sulphur, and also containing substantially no coloring matter or other ingredient which can chemically react with the aluminum chloride solution. I desire particularly to avoid the use of any ingredient which can discolor the aluminum chloride solution or impart an objectionable odor thereto.

Other objects of my invention will be set forth in the following description and drawing which illustrate preferred embodiments thereof, it being understood that the above general statement of the objects of my invention is intended to generally explain the same and not to limit it in any manner.

Fig. 1 is an elevation.

Fig. 2 is a sectional view.

The drawing conventionally illustrates a bottle 10 having a neck 11 which is provided with an outer thread 13. The cap 12 is provided with a cooperating thread, and a gasket 16 is included in order to provide a gas-tight fit. The cap 12 is provided with a recessed shank 15 to which the applicator rod 14 is secured in any suitable manner. The applicator rod 14 is preferably made of hard rubber and the applicator 19, made of suitable sponge rubber, is connected to a collar 18 made of relatively soft and resilient rubber which is held on to the applicator rod 14 by means of the enlarged head 17 of said rod 14.

For many years the manufacturers of aluminum chloride deodorants have been seeking in vain for a suitable applicator. It has been proposed to use cotton and other textile materials, but such materials are quickly and vigorously attacked by the aluminum chloride because the solution thereof has an acid reaction. It has been proposed to use an ordinary glass applicator rod but this is objectionable because sufficient of the material cannot be readily applied, and likewise the glass is brittle. It has also been proposed to make the applicator from various resins such as phenol-formaldehyde condensation resins of the "bakelite" type, but such resins are objectionable because they impart a decided odor to the aluminum chloride solution. It has been proposed to use more or less porous wood for applying the aluminum chloride solution but wood is completely disintegrated in a short time by said solution.

It has also been proposed to use rubber but I have discovered that ordinary rubber composition is not suitable for this specific purpose. Ordinary rubber composition contains a certain amount of free or uncombined sulphur and this sulphur reacts with the aluminum chloride solution in order to form polysulfides or other soluble sulphur salts, which discolor the solution and impart an odor thereto. It has been heretofore proposed to use a sponge rubber applicator for this purpose, but I have discovered that such applicators were unsatisfactory because they contained free sulphur. The result was an objectionable discoloring of the solution and imparting an objectionable odor thereto, and in addition the ordinary sponge rubber applicator hardened more or less, depending upon the particular composition employed. Likewise, it was customary to incorporate coloring material into said sponge rubber applicators, and said coloring material reacted with the aluminum chloride solution.

According to my invention, the sponge rubber applicator 19, the hard rubber rod 14, and the relatively stretchable and resilient soft rubber member 18 are vulcanized with a minimum amount of sulphur so that said rubber members contain no free sulphur after vulcanization. While an imperceptible amount of sulphur in the uncombined or free state may be present, this is not sufficient to discolor the aluminum chloride solution, or to result in any of the objectionable features above mentioned, for ordinary commercial purposes.

In order to reduce the amount of sulphur employed in the vulcanization of said rubber members, I prefer to use a maximum amount of accelerators and a minimum amount of sulphur. This is particularly important in making the sponge rubber applicator 19.

This sponge rubber applicator may be made from latex by any suitable process known to the trade. It likewise may be made from so-called Pará rubber of commerce.

The important feature is to eliminate sulphur as much as possible. For example, if a gas-forming substance is added to the rubber in order to produce the porous or sponge structure, such gas-forming substance should preferably be ammonium carbonate or the like, instead of utilizing a sulphur compound.

Likewise, the sponge rubber member 19 should be substantially free from any added coloring material, save that I may employ lamp black which is inert to the action of aluminum chloride. Likewise, I eliminate any loading or coloring material which can be attacked by aluminum chloride. The sponge rubber applicator 19 consists essentially of rubber and lamp black and without any added material, save that, of course, a very small percentage of sulphur has combined with the rubber during the vulcanization process.

One of the characteristics of a sponge rubber made according to the improved composition is that it can be subjected to low temperatures without freezing and becoming solid. For example, the improved sponge rubber can be subjected to a temperature as low as the freezing point of water, without hardening. Ordinary sponge rubber becomes solid at such low temperature so that it can be cut into pieces, if desired.

The cap 12 may be also made of hard rubber (if desired), although this cap 12 may be made of a phenol-formaldehyde condensation resin, if desired, as the solution does not come into direct contact with the cap to the same extent that said solution comes into contact with the members 14, 18 and 19.

The container 10 is made of glass or any other suitable material. If desired, the cap 14 may be made of glass or of the improved rubber composition specified herein. Likewise, the rod 14 may be formed integrally with the cap 12. The rod 14 may have a drive fit in the shank 15, and the rod 14 and the cap 12 may be connected by any suitable mechanical or other means which are unaffected by the action of the aluminum chloride solution.

It is to be understood that I am not limited to the physical structure shown in the annexed drawing and that the essential feature of the invention is the improved composition which can resist the action of aluminum chloride solution.

Certain processes have been developed for vulcanizing rubber without the use of sulphur, as for example by the use of tri-nitro-benzol. However, the use of such non-sulphur agents imparts an objectionable odor to the rubber. I therefore prefer to use sulphur for vulcanizing the rubber but to eliminate free or uncombined sulphur. The aluminum chloride solution which is used in deodorants is never absolutely pure and it contains iron impurities, for example. If such iron impurities react with the uncombined sulphur, the effect is to produce a black precipitate.

The gasket 16 is also made of suitable inert material.

I have shown a preferred embodiment of my invention, but it is clear that numerous changes and omissions can be made without departing from its spirit.

I claim:

1. An applicator for use in applying aluminum chloride solutions of the type ordinarily used in deodorants, which comprises a dauber formed of sponge rubber whose free sulphur content has been reduced to a minimum so as to minimize discoloration or malodorization of the solutions.

2. An applicator for use in applying aluminum chloride solutions of the type ordinarily used in deodorants, which comprises a sponge rubber dauber whose free sulphur content has been reduced to a minimum so as to minimize discoloration or malodorization of the solutions, and a collar secured thereto, said collar having an opening, a rod having a handle at one end, the other end thereof having an enlarged portion adapted to fit within the opening in said collar and be firmly supported therein.

MARSHALL T. BREKKE.